Patented June 26, 1923.

1,459,959

UNITED STATES PATENT OFFICE.

JAMES M. SHERMAN, OF WASHINGTON, DISTRICT OF COLUMBIA, AND ROSCOE H. SHAW, OF CHICAGO, ILLINOIS; DEDICATED, BY MESNE ASSIGNMENTS, TO THE PEOPLE OF THE UNITED STATES.

PROCESS FOR THE ACCELERATION OF PROPIONIC FERMENTATION.

No Drawing. Application filed August 26, 1922. Serial No. 584,541.

(FILED UNDER THE ACT OF MARCH 3, 1883, 22 STAT. L., 625.)

*To all whom it may concern:*

Be it known that we, JAMES M. SHERMAN and ROSCOE H. SHAW, citizens of the United States of America, the former an employee of the Department of Agriculture of the United States of America, residing at Washington, District of Columbia, and Chicago, Illinois, respectively, have invented a new and useful Process for the Acceleration of Propionic Fermentation, of which the following is a specification.

This application is made under the act of March 3, 1883, chapter 143 (22 Stat., 625) and the invention herein described and claimed may be used by the Government of the United States, its officers and employees, and by any person in the United States either in public or private work without payment to us of any royalty thereon.

Our invention relates to a process for the acceleration of propionic fermentation by the use of certain organisms that increase the chemical activity of the organisms primarily causing the fermentation.

We have found that the production of propionates and acetates from carbohydrates and salts of organic acids by use of organisms of the type of *Bacterium acidi propionici* may be accelerated by the presence of certain other organisms which do not produce propionates of themselves. In inoculation with a propionic organism, an accelerating organism may be introduced by an additional inoculation, or the accelerating organism may be introduced by having it already growing in the same culture with the inoculating propionic organism.

These accelerating organisms are substantially included in the following classes, but this statement is not to be construed as limiting the operation of this invention to the use of organisms of the classes specifically named: 1. Those organisms which produce lactic acid from carbohydrates, the salts of which acid are also acted upon by the propionic organism to yield propionates and acetates: e. g., *Streptococcus lactis*, *Lactobacillus casei*: 2. Those organisms which do not act on the fermenting carbohydrate, but whose action is mainly proteolytic:— e. g., *Proteus vulgaris*: 3. Those organisms which neither act upon the carbohydrate present nor are proteolytic in nature, but which ferment salts of organic acids: e. g., *Bacterium alcaligenes*.

We claim:

1. The use of *Lactobacillus casei* to increase the rate of production of propionates from carbohydrates by action of organisms of the type of *Bacterium acidi propionici*.

2. The use of *Proteus vulgaris* to increase the rate of production of propionates from carbohydrates by action of organisms of the type of *Bacterium acidi propionici*.

3. The use of *Bacterium alcaligenes* to increase the rate of production of propionates from carbohydrates by action of organisms of the type of *Bacterium acidi propionici*.

4. The use of *Lactobacillus casei* to increase the rate of production of propionates from salts of organic acids by action of organisms of the type of *Bacterium acidi propionici*.

5. The use of *Proteus bulgaris* to increase the rate of production of propionates from salts of organic acids by action of organisms of the type of *Bacterium acidi propionici*.

6. The use of *Bacterium alcaligenes* to increase the rate of production of propionates from salts of organic acids by action of organisms of the type of *Bacterium acidi propionici*.

7. The use of *Lactobacillus casei* to accelerate the chemical activity of organisms of the type of *Bacterium acidi propionici*.

8. The use of *Proteus vulgaris* to accelerate the chemical activity of organisms of the type of *Bacterium acidi propionici*.

9. The use of *Bacterium alcaligenes* to accelerate the chemical activity of organisms of the type of *Bacterium acidi propionici*.

10. The use of *Lactobacillus casei* to increase the rate of reproduction of organisms of the type of *Bacterium acidi propionici*.

11. The use of *Proteus vulgaris* to increase the rate of reproduction of organisms of the type of *Bacterium acidi propionici*.

12. The use of *Bacterium alcaligenes* to increase the rate of reproduction of organisms of the type of *Bacterium acidi propionici*.

13. The use of organisms which produce lactic acid from carbohydrates, the salts of which acid are also acted upon by the propionic organism to yield propionates and acetates, to increase the rate of production of propionates from carbohydrates by action of organisms of the type of *Bacterium acidi propionici*.

14. The use of organisms which do not act on the fermenting carbohydrate, but whose action is mainly proteolytic, to increase the rate of production of propionates from salts of organic acids by action of organisms of the type of *Bacterium acidi propionici*.

15. The use of organisms which do not act upon the carbohydrate present and are not proteolytic in nature, but which ferment salts of organic acids, to increase the rate of reproduction of organisms of the type of *Bacterium acidi propionici*.

JAMES M. SHERMAN.
ROSCOE H. SHAW.